United States Patent
Kamuf et al.

(10) Patent No.: US 8,005,039 B2
(45) Date of Patent: Aug. 23, 2011

(54) METHOD AND APPARATUS FOR ROBUST TRANSMISSION OF CONTROL INFORMATION IN WIRELESS COMMUNICATION NETWORK

(75) Inventors: Matthias Kamuf, Lund (SE); Christian Bergljung, Lund (SE); Bo Lincoln, Lund (SE)

(73) Assignee: Telefonaktiebolaget LM Ericsson (publ), Stockholm (SE)

( * ) Notice: Subject to any disclaimer, the term of this patent is extended or adjusted under 35 U.S.C. 154(b) by 100 days.

(21) Appl. No.: 12/464,615

(22) Filed: May 12, 2009

(65) Prior Publication Data

US 2010/0165847 A1 Jul. 1, 2010

Related U.S. Application Data

(60) Provisional application No. 61/141,278, filed on Dec. 30, 2008.

(51) Int. Cl.
*H04W 4/00* (2009.01)
(52) U.S. Cl. ..................................................... 370/328
(58) Field of Classification Search .......... 370/203–208, 370/324–339, 342, 349
See application file for complete search history.

(56) References Cited

U.S. PATENT DOCUMENTS

| | | | |
|---|---|---|---|
| 7,317,917 | B2 | 1/2008 | Qian et al. |
| 7,353,039 | B2 | 4/2008 | Czaja et al. |
| 7,480,270 | B2 | 1/2009 | Achour et al. |
| 2005/0163076 | A1 | 7/2005 | Vannithamby et al. |
| 2007/0211662 | A1 | 9/2007 | Hyon et al. |
| 2007/0217388 | A1* | 9/2007 | Shiizaki et al. ............. 370/349 |
| 2008/0014951 | A1 | 1/2008 | Laroia et al. |
| 2008/0090528 | A1 | 4/2008 | Malladi |
| 2010/0080187 | A1* | 4/2010 | Papasakellariou et al. ... 370/329 |

FOREIGN PATENT DOCUMENTS

| | | |
|---|---|---|
| EP | 1835649 A1 | 9/2007 |
| WO | 2007/084482 A2 | 7/2007 |
| WO | 2008/041819 A2 | 4/2008 |

OTHER PUBLICATIONS

Love et al, Downlink Control Channel Design for 3GPP LTE, IEEE, 6 pages, 2008.*
3GPP TS 36.212 V8.3.0, Multiplexing and channel coding (Release 8), 48 pages, 2008.*
Response to non-final Office Action mailed May 18, 2009 in U.S. Appl. No. 11/681,302, filed Mar. 2, 2007.
Non-final Office Action mailed Feb. 27, 2009 in U.S. Appl. No. 11/681,302, filed Mar. 2, 2007.

(Continued)

*Primary Examiner* — Frank Duong
(74) *Attorney, Agent, or Firm* — Coates & Bennett, P.L.L.C.

(57) ABSTRACT

A base station includes transmitter and associated processing circuits. The transmitter circuits are configured to transmit control information and data traffic to mobile terminals in repeating transmission intervals, each interval having defined control and data portions. The processing circuits are configured to dynamically determine that the control portion has insufficient resources for transmitting control information to one or more of the mobile terminals, and, in response, at least temporarily transmit control information in the data portion, rather than in the control portion, for a selected one or more of the mobile terminals. Correspondingly, a mobile terminal is configured to selectively search for and decode control information in the data portion of one or more transmission intervals, rather than in the control portion.

21 Claims, 8 Drawing Sheets

OTHER PUBLICATIONS

Nortel Networks, "Support of Wider Bandwidth for LTE-Advanced," TSG-RAN1 #55, R1-084474, 3rd Generation Partnership Project (3GPP), Nov. 10-14, 2008, pp. 1-10, Prague, Czech Republic.

Samsung, "PDCCH Extension to Support Operation with CI," TSG RAN WG1 #58bis, R1-094082, 3rd Generation Partnership Project (3GPP), Oct. 12-16, 2009, pp. 1-2, Miyazaki, Japan.

* cited by examiner

METHOD AND APPARATUS FOR ROBUST TRANSMISSION OF CONTROL INFORMATION IN WIRELESS COMMUNICATION NETWORK

RELATED APPLICATIONS

This application claims priority under 35 U.S.C. §119 from the U.S. Provisional Patent Application Ser. No. 61/141,278, which was filed on 30 Dec. 2008 and entitled "Increasing Robustness of LTE Control Channels."

FIELD OF THE INVENTION

The present invention generally relates to wireless communication networks, such as Long Term Evolution (LTE) networks, and particularly relates to improving the robustness of control channel transmissions in such networks.

BACKGROUND

In Release 8 of the Long Term Evolution (LTE) standards, as promulgated by the THIRD GENERATION PARTNERSHIP PROJECT (3GPP), a mobile terminal or other User Equipment (UE) is assigned data on a time-frequency basis. A given allocation of particular radiofrequency sub-carriers for a given interval of time is referred to as a Resource Block (RB), and resource allocations (uplink or downlink) generally are made on an ongoing, scheduled basis.

Figure 1:
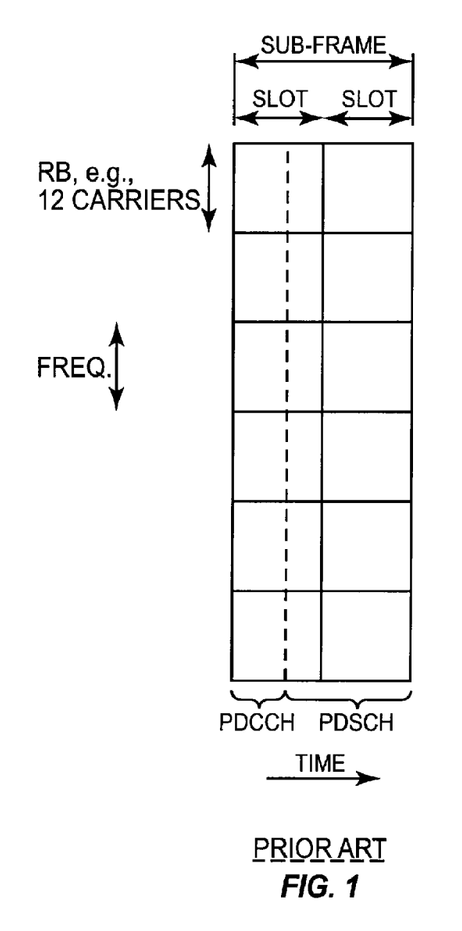
FIG. 1 is a diagram of a conventional PDCCH/PDSCH sub-frame for an LTE signal.

Accordingly, an LTE base station, referred to as an "eNodeB," transmits control information to mobile terminals that, among other things, identify scheduled resource allocations. In particular, on the Orthogonal Frequency Division Multiplex (OFDM) downlink, the eNodeB transmits Downlink Control Information (DCI) to targeted ones in a plurality of mobile terminals on a Physical Downlink Control Channel (PDCCH), and transmits user data to targeted ones in the plurality of mobile terminals on an associated Physical Downlink Shared Channel (PDSCH). An example PDCCH/PDSCH sub-frame is shown in FIG. 1.

The PDCCH and the associated PDSCH are transmitted within repeating sub-frames of the OFDM signal, e.g., the first N symbol times of each given sub-frame are allocated as the PDCCH, and the remainder of the sub-frames are allocated as the PDSCH. In each sub-frame, each mobile terminal blindly decodes the PDCCH, looking for a DCI message targeted to it. Terminal-specific Medium Access Control (MAC) layer identifiers are used to indicate the targets of the transmitted DCI messages. There are different types of DCI messages, but they include downlink resource assignment messages. If a mobile terminal receives a downlink resource assignment message in a given sub-frame, it uses that information to identify the particular time-frequency resource allocations used in the PDSCH of that sub-frame to carry user data targeted to the mobile terminal.

Consequently, failure by the mobile terminal to correctly decode the DCI message leads to data reception failures, e.g., the mobile terminal will not detect a targeted DCI message and therefore miss the corresponding transmission of user data on the PDSCH, or, while not likely because of CRC protection, it may incorrectly identify the particular PDSCH resource allocation for its user data, and attempt to decode the wrong data. Depending upon the type of DCI message involved, DCI decoding failures have other consequences, such as missed or incorrectly scheduled uplink transmissions, power control interruptions or misbehavior, etc. One may refer to the Technical Specification TS36.212 for comprehensive DCI details, but it may be helpful to identify selected details here.

For example, information about location, modulation and the eNodeB's transmission schemes, etc., is included in the PDCCH of each sub-frame. For a given system bandwidth, the number of OFDM symbols to be used for this control signaling mainly depends on the number of mobile terminals that are to be scheduled in the current sub-frame. Each DCI (message) contains information identifying how to unambiguously decode its scheduled assignments for a particular mobile terminal.

Figure 2:
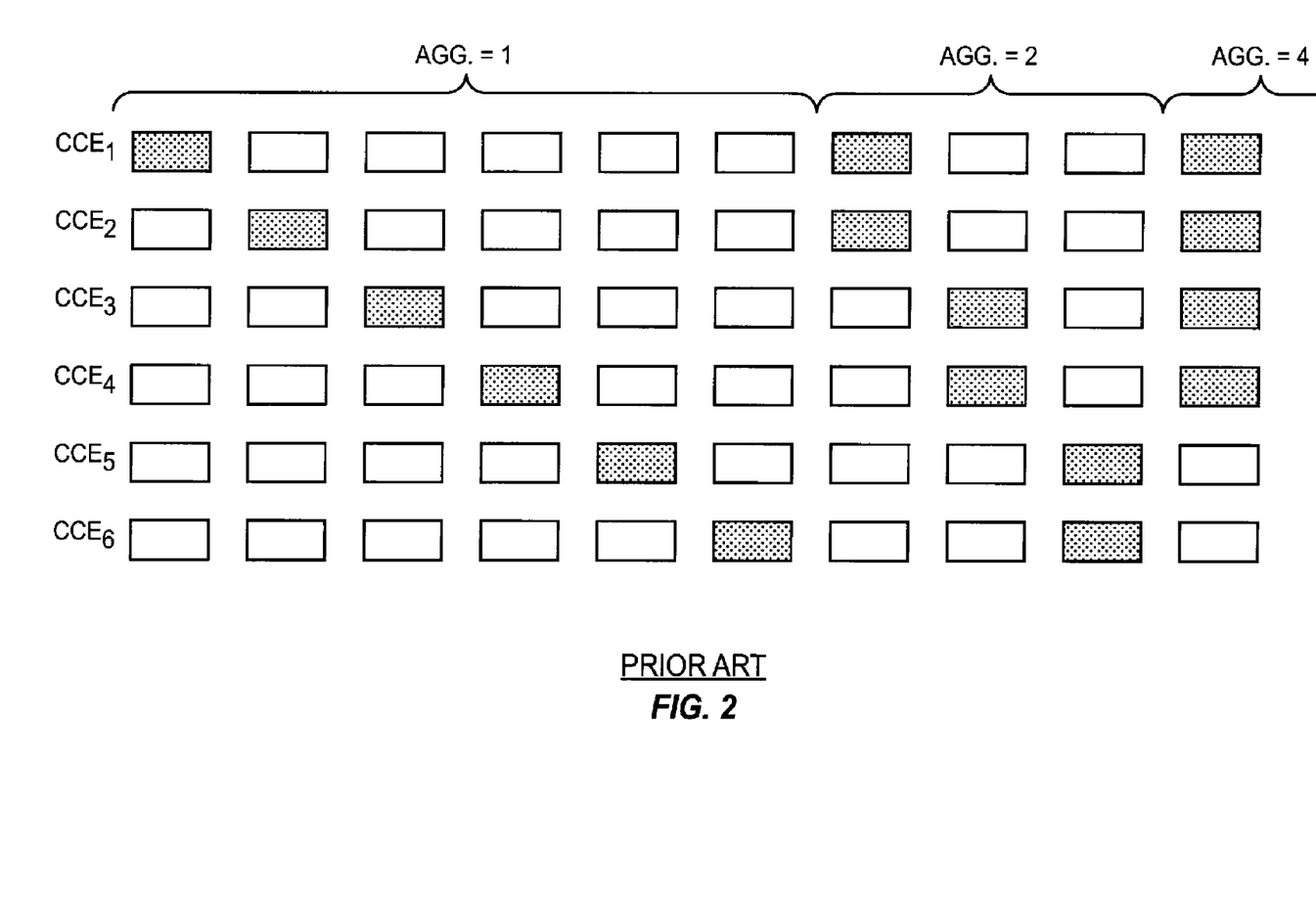
FIG. 2 is a diagram of known CCE aggregations for transmitting control information on the PDCCH.

In the current standards, there is an upper limit on how many bits can be used to encode the DCI for a given mobile terminal. Of course, the number of total bits available for transmitting a DCI places a defined upper limit on the amount of error protection coding available. That is, the DCI bit totals define a maximum coding gain available. More particularly, a DCI can be coded into up to 8 Channel Control Elements (CCEs), where a CCE is defined as 36 Resource Elements (REs), or QPSK symbols, which is equivalent to 72 bits. With this arrangement, an example of which appears in FIG. 2, the lowest coding rate becomes X/576, where X is the number of un-coded bits—including a 16-bit CRC—for the DCI. This code rate mainly determines the decoding performance achievable at the targeted mobile terminal, and thus determines that terminal's ability to reliably decode scheduled assignments.

For a small system bandwidth, where a low number of RBs are available within a given defined OFDM frequency band, the number of mobile terminals and the corresponding individual code rates that can be scheduled is limited by the number of CCEs available. In certain reception conditions, and for certain DCI coding rates, reception performance, e.g., Block Error Rate (BLER) performance, for DCI decoding at a given mobile terminal may be unacceptable. For example, assuming an LTE OFDM bandwidth of 1.4 MHz, eNodeB transmission from two antennas, and a DCI coding rate of ⅙, relatively high BLER is experienced by a mobile terminal operating under a typical RAN4 test scenario.

SUMMARY

In one embodiment, a base station for use in a wireless communication network includes transmitter circuits and one or more processing circuits that are operatively associated with the transmitter circuits. The transmitter circuits are configured to transmit control information and data traffic to mobile terminals in repeating transmission intervals, each transmission interval having a control portion that is defined for transmitting control information to targeted ones of the mobile terminals and a data portion that is defined for transmitting data traffic to targeted ones of the mobile terminals. Advantageously, the processing circuits are configured to dynamically determine that the control portion has insufficient resources for transmitting control information to one or more of the mobile terminals, and, responsive to that determination, at least temporarily transmit control information in the data portion, rather than in the control portion, for a selected one or more of the mobile terminals.

In one such embodiment, the base station dynamically determines that the control portion has insufficient resources for transmitting control information to one or more of the mobile terminals by determining that an overall information-carrying capacity of the control portion is insufficient, in consideration of collective amounts of control information to be sent in the control portion and corresponding coding gains needed for reliable reception of that control information. Additionally, or alternatively, the base station dynamically determines that the control portion has insufficient resources for transmitting control information to one or more of the mobile terminals by determining that radio reception conditions at a particular one or more of the mobile terminals are such that a maximum coding gain achievable for control information transmitted in the control portion is insufficient for reliable reception of control information at the particular one or more of the mobile terminals.

In instances where the maximum coding gain achievable in the control portion is deemed insufficient for reliable reception at a given mobile terminal, the base station in one or more embodiments temporarily transmits control information targeted to that mobile terminal in the data portion, using a coding gain that is higher than the maximum coding gain of the control portion. Further, in at least one such embodiment, the base station reverts back to transmitting control information to the given mobile terminal in the control portion, responsive to determining that the maximum coding gain of the control portion is sufficient for reliable reception of control information at the given mobile terminal.

Still further, in at least one embodiment, the base station comprises, for example, a Long Term Evolution (LTE) base station. Here, the base station is configured to transmit control information and data traffic to mobile terminals in repeating transmission intervals by transmitting an Orthogonal Frequency Division Multiplex (OFDM) signal including repeating sub-frames as said repeating transmission intervals, each sub-frame comprising a Physical Downlink Control Channel (PDCCH) as the control portion of the sub-frames, and a Physical Downlink Shared Channel (PDSCH) as the data portion of the sub-frames. In such embodiments, at least temporarily transmitting control information in the data portion, rather than in the control portion, comprises transmitting control information that is targeted to a selected one or more mobile terminals on the PDSCH, rather than on the PDCCH.

Still further, in at least one such embodiment, the base station is configured to at least temporarily define an Extended PDCCH (E-PDCCH) on the PDSCH. In correspondence to defining this extended control channel as a logical sub-channel of the PDSCH, the base station is configured to transmit control information that is targeted to the selected one or more mobile terminals on the PDSCH by transmitting that control information on the E-PDCCH. In one or more such embodiments, the base station is configured to transmit pointers on the PDCCH, which identify the location of control information for the selected one or more mobile terminals on the E-PDCCH.

Of course, the present invention is not limited to the above features and advantages. Indeed, those skilled in the art will recognize additional features and advantages upon reading the following detailed description, and upon viewing the accompanying drawings.

DETAILED DESCRIPTION

Figures 3, 4:
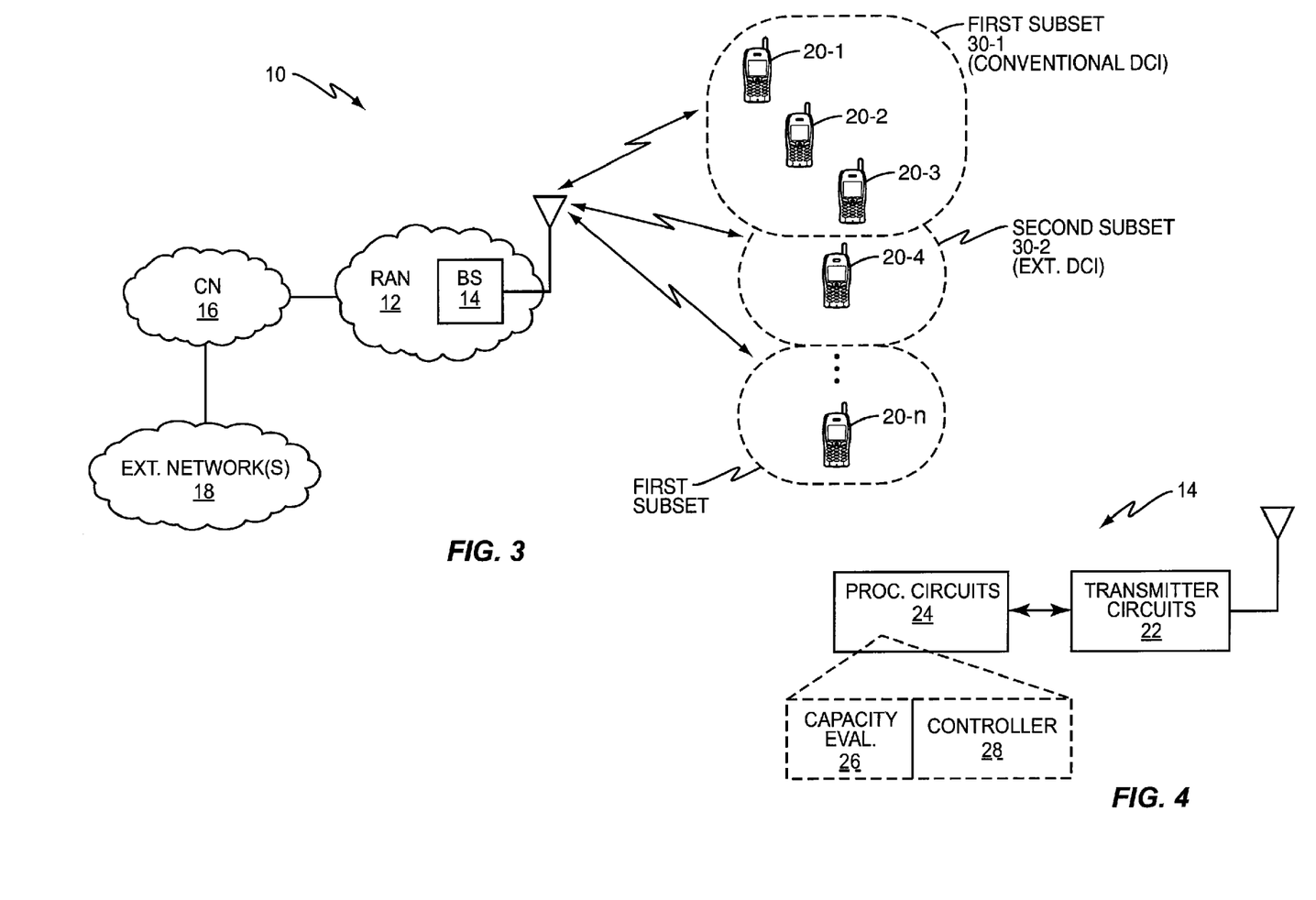
FIG. 3 is a block diagram of a wireless communication network, including one embodiment of a base station configured to selectively send control information in data regions of a transmission signal, and one embodiment of a mobile terminal configured to selectively search for and decode control information from the data regions of the base station's signal.
FIG. 4 is a block diagram depicting one embodiment of base station transmission and processing circuits.

FIG. 3 illustrates a wireless communication network 10 that includes a Radio Access Network (RAN) 12 having one or more base stations 14. The base stations 14 are communicatively coupled to a Core Network (CN) 16 that is, in turn, communicatively coupled to one or more external networks 18, such as the Internet or other packet data networks. Based on this arrangement, the network 10 communicatively couples mobile terminals 20—shown as terminals 20-1, 20-2, and so on—to each other and/or to other user equipment or systems accessible via the external networks 18.

FIG. 4 provides example details for an embodiment of the base station 14, and, according to those example details, the base station 14 comprises transmitter circuits 22 and one or more processing circuits 24. The transmitter circuits 22 are configured to transmit control information and data traffic to mobile terminals 20 in repeating transmission intervals. Each transmission interval has a control portion that is defined for transmitting control information to targeted ones of the mobile terminals and a data portion that is defined for transmitting data traffic to targeted ones of the mobile terminals. Correspondingly, the processing circuits 24 are operatively associated with the transmitter circuits and are configured to dynamically determine that the control portion has insufficient resources for transmitting control information to one or more of the mobile terminals. The processing circuits 24 are further configured to at least temporarily transmit control information in the data portion, rather than in the control portion, for a selected one or more of the mobile terminals in response to the determination.

In at least one embodiment, the processing circuits 24 include a capacity evaluator 26 that is configured to determine, e.g., on a dynamic basis, whether the capacity of the control portion is insufficient for reliably transmitting to one, some, or any of mobile terminals 20 being supported by the base station 14. An associated controller 28 is correspondingly configured to control whether control information is sent exclusively in the control portion, or sent in the data portion (for one or more of the mobile terminals 20). In other words, to the extent that the control portion capacity is deemed to be insufficient, the control information for a selected one or more of the mobile terminals 20 is shifted, at least temporarily, from transmission in the control portion to transmission in the data portion.

In one or more embodiments, the base station 14, e.g., via the controller 28, is configured to select the selected one or more of the mobile terminals 20 according to a function that minimizes transmission resources in the data portion that are given over to the transmission of control information. Further, in one or more embodiments, the base station 14 is configured to dynamically determine that the control portion has insufficient resources for transmitting control information to one or more of the mobile terminals 20 by determining that an overall information-carrying capacity of the control portion is insufficient, in consideration of collective amounts of control information to be sent in the control portion and corresponding coding gains needed for reliable reception of that control information.

In other words, the base station 14 in such embodiments deems the control portion as having insufficient resources if the total amount of control information to be sent to targeted ones of the mobile terminals 20 in any one or more transmission intervals exceeds the information-carrying capacity of the control portion. Of course, the amount of coding gain needed for encoding control information for reliable transmission to particular mobile terminals 20 depends on the channel qualities associated with those mobile terminals 20. Thus, the information-carrying capacity of the control portion may vary, in the sense that more information can be sent if lower coding gains are permissible, while less can be sent if higher coding gains (more redundancy) is needed.

In at least one embodiment, the base station 14 is configured to dynamically determine that the control portion has insufficient resources for transmitting control information to one or more of the mobile terminals by determining that radio reception conditions at a particular one or more of the mobile terminals 20 are such that a maximum coding gain achievable for control information transmitted in the control portion is insufficient for reliable reception of control information at the particular one or more of the mobile terminals. For example, in referring back to FIG. 2, one sees that, in LTE embodiments, there is an upper limit on the number of CCEs that can be allocated to encoding the control information targeted to any given one of the mobile terminals 20. This cap on the number of CCEs corresponds to a maximum coding gain available for encoding the control information targeted to any given one of the mobile terminals 20.

As a practical matter, in LTE or otherwise, there is a finite limit on the coding gain available for encoding the control information to be transmitted to any given mobile terminal. However, it may be that with the given channel structures, the amount of channel resources available, etc., that the achievable coding gain of the data portion exceeds that of the control portion. Thus, in one or more embodiments, the base station 14 is configured to at least temporarily transmit control information in the data portion, rather than in the control portion, by transmitting control information targeted to a particular one or more of the mobile terminals 20 in the data portion using a coding gain that is higher than the maximum coding gain achievable in the control portion.

For example, in one or more embodiments, the base station 14 determines that a maximum coding gain achievable for transmission of control information in the control portion is insufficient for reliable reception of control information by a given one of the mobile terminals 20. A given one or more of the mobile terminals 20 may be experiencing poor reception conditions. In this context, the base station 14 at least temporarily transmits control information in the data portion by, at least for so long as the maximum coding gain of the control portion is deemed insufficient, transmitting control information that is targeted to the given mobile terminal(s) in the data portion, rather than in the control portion. Further, the base station 14 in at least one such embodiment is configured to revert back to transmitting control information that is targeted to the given mobile terminal(s) 20 in the control portion, responsive to determining that the maximum coding gain achievable in the control portion is sufficient for reliable reception of control information by the given mobile terminal(s).

Referring to FIG. 3 again, momentarily, one sees that the mobile terminals 20 may be grouped by the base station 14 into a first subset 30-1 and a second subset 30-2. That is, the base station 14 may be configured in one or more embodiments to form logical subsets of the mobile terminals 20 it is supporting, where control information targeted to mobile terminals 20 in the first subset 30-1 is sent in the control portion of the base station's transmission intervals. Conversely, control information targeted to mobile terminals 20 in the second subset 30-2 is sent in the data portion of the transmission intervals.

Those skilled in the art will appreciate that the base station 14 in one or more embodiments is configured to dynamically determine subset membership, and that, for any given transmission interval, no control information may be sent in the data portion. More broadly, it should be understood that the base station 14 may be configured to dynamically evaluate whether the control portion has sufficient resources for transmitting the control information needed to be transmitted in any given transmission interval, and to correspondingly select which mobile terminals 20 are logically placed in the second subset 30-2 (for one, two, or more transmission intervals).

Figure 5:
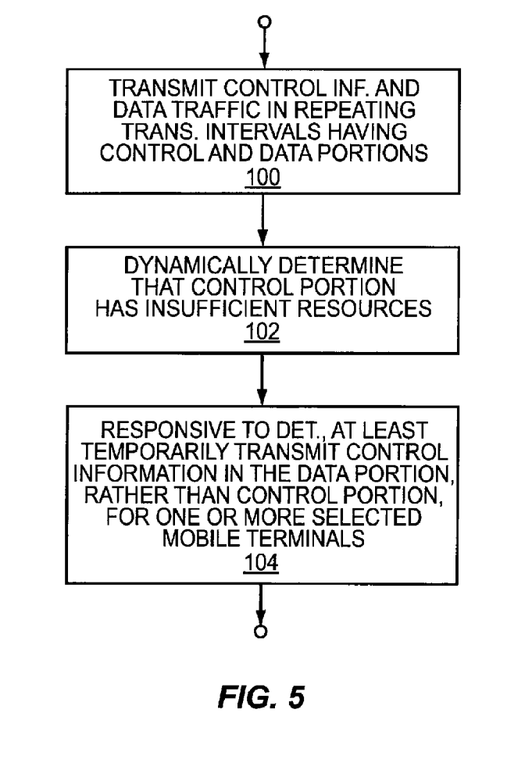
FIG. 5 is a logic flow diagram depicting one embodiment of base station processing logic.

In general, as shown in the example logic flow diagram of FIG. 5, the base station 14 implements a method transmitting downlink control information (DCI) to a plurality of mobile terminals 20. The method includes transmitting control information and data traffic to the mobile terminals 20 in repeating transmission intervals (Block 100). Each transmission interval has a control portion that is defined for transmitting control information to targeted ones of the mobile terminals and a data portion that is defined for transmitting data traffic to targeted ones of the mobile terminals. The method further includes dynamically determining that the control portion has insufficient resources for transmitting control information to one or more of the mobile terminals (Block 102), and responsive to said determining, at least temporarily transmitting control information in the data portion, rather than in the control portion, for a selected one or more of the mobile terminals (Block 104).

As an example, the processing circuits 24 of the base station 14 include one or more microprocessors, along with associated program and data memory circuits, and supporting interface circuits. With this configuration, at least some of the processing illustrated in FIG. 5 is carried out by the base station 14, based on its execution of program instructions in one or more computer programs that are stored in a computer-readable medium included in or accessible by the base station 14, e.g., one or more non-volatile memory circuits, hard disks, etc.

Figure 6:
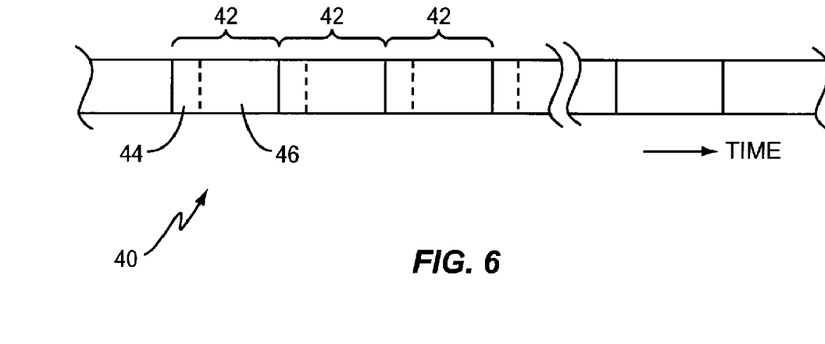
FIGS. 6 and 7 are diagrams of a base station's transmission signal, illustrating control/data transmission for the case where all control information is carried in the control portion of the transmit signal (FIG. 6), and for the case where at least some control information is carried in the data portion of the transmit signal (FIG. 7).

Regardless of these example implementation details, FIG. 6 illustrates an example downlink signal structure, as used by the base station 14. One sees a downlink signal 40 that logically comprises a series of repeating transmission intervals 42, each divided into a control portion 44 and a data portion 46. For example, in LTE, the downlink signal 40 comprises a number of sub-carriers collectively representing an OFDM frequency band. In this context, the transmission intervals 42 comprise ½ millisecond sub-frames, with the control and data portions 44 and 46 comprising different time-frequency resources within the sub-frame.

Figure 7:
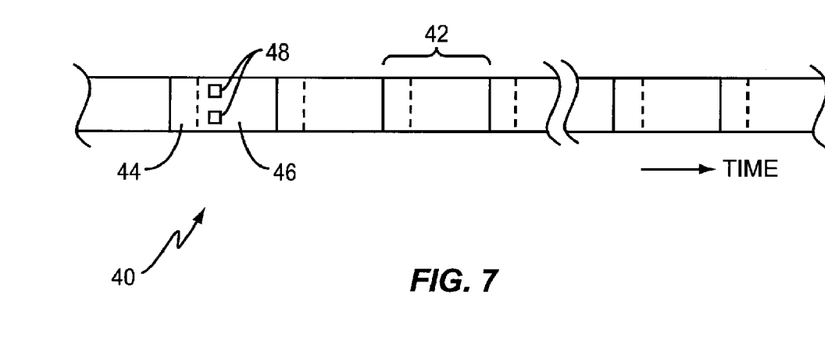

FIG. 7 illustrates the transmit signal 40, for the case where at least some signal resources 48 within the data portion 46 of one or more intervals 42 are allocated to carrying control information, rather than data. In the LTE case, these signal resources 48 would be specific time-frequency resource allocations within the overall set of time-frequency resources comprising the data portion 46.

Figure 8:
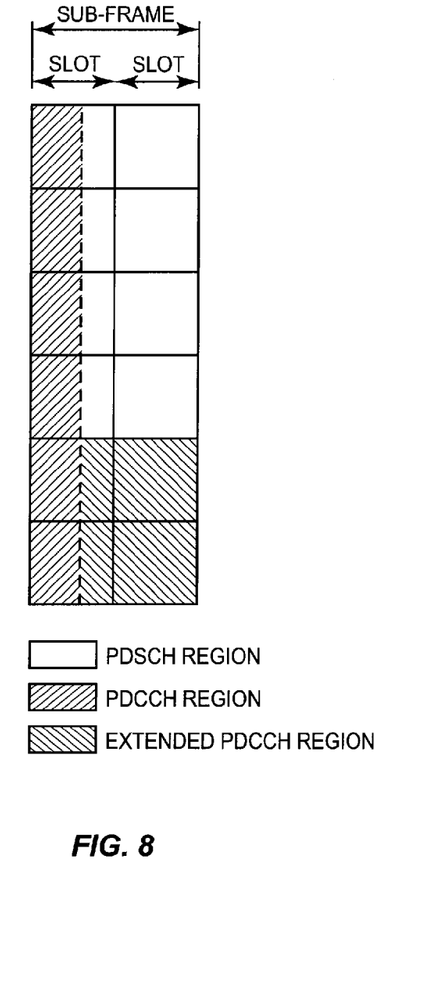
FIG. 8 is a diagram for an LTE embodiment contemplated herein, where an extended PDCCH region is defined within the PDSCH portion of an LTE sub-frame, for the transmission of selected control information within that extended PDCCH region.

More particularly, FIG. 8 illustrates one LTE-specific example, where the downlink signal includes repeating sub-frames, where a first portion of each sub-frame serves as the PDSCH, for carrying DCI to targeted mobile terminals 20, and the remaining portion of each sub-frame serves as the PDSCH, for carrying data traffic to targeted mobile terminals 20. However, one sees that this basic structure is modified, such that some DCI is transmitted on the PDSCH. That is, the DCI targeted to one or more mobile terminals 20 is transmitted on the PDCCH, as is conventional, while the DCI targeted to one or more other mobile terminals 20 is transmitted on the PDSCH. The region(s) of the PDSCH that are allocated for carrying DCI rather than data traffic are referred to as the Extended PDCCH (E-PDCCH).

Figure 9:
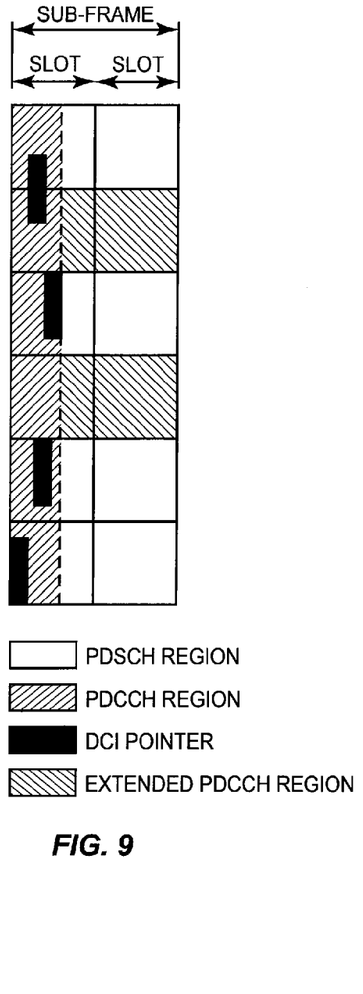
FIG. 9 is a diagram for an LTE embodiment contemplated herein, where pointers are transmitted in the control region of a sub-frame, pointing to PDSCH resources used for carrying control information, rather than data traffic.

Thus, in one or more LTE embodiments contemplated herein, an E-PDCCH is defined within the PDSCH, possibly on an as-needed basis, and is used to carry DCI to selected mobile terminals 20. Higher-layer signaling is used in one embodiment, wherein the base station 14 indicates the location(s) of the E-PDCCH within the time-frequency resources of the PDSCH. In other embodiments, the location(s) are known to the mobile terminals 20, e.g., according to a default arrangement, and such signaling is not needed. In still other embodiments, the base station 14 is configured to transmit some DCI on the PDCCH, and some DCI on the E-PDCCH, carried as a logic sub-channel of the PDSCH. However, as shown in FIG. 9, the base station 14 transmits DCI pointers, as needed, on the PDCCH. The DCI pointers point to the respective locations used for the E-PDCCH, i.e., the DCI pointers indicate where to find DCI in the PDSCH. Each such pointer can be coded to the MAC ID or other identifier of a particular mobile terminal 20, such that a given mobile terminal 20 recognizes DCI pointers targeted to it. One advantage of the pointers is that they are small, meaning that the maximum coding gain available in the PDCCH generally will be sufficient for reliably encoding them for transmission to mobile stations 20, even ones in poor channel conditions.

Figure 10:
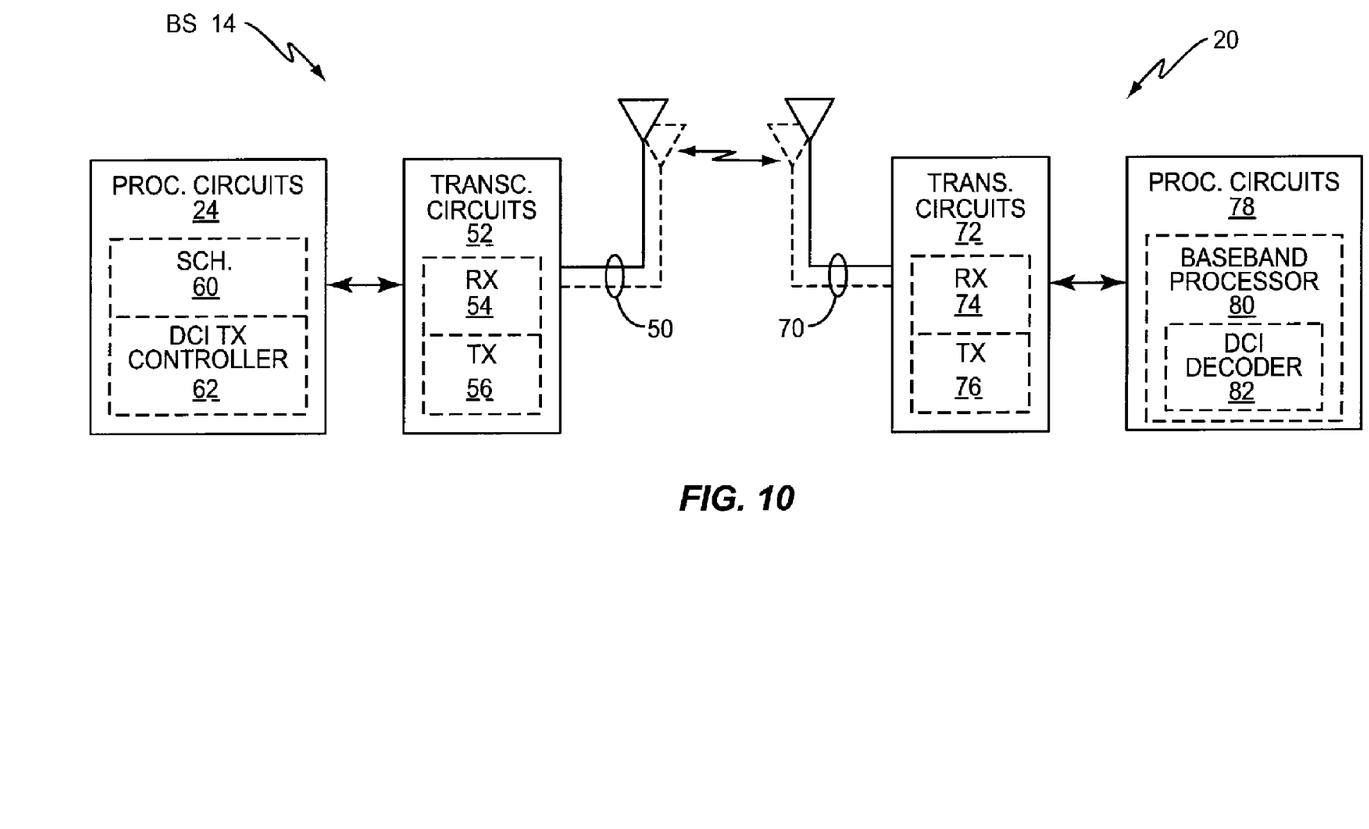
FIG. 10 is a block diagram for another embodiment of a base station and a mobile terminal, such as used for the transmission/reception of DCI in an LTE embodiment.

Continuing with the LTE example, FIG. 10 depicts a block diagram of the base station 14 and a mobile station 20, as may be implemented for LTE versions of those entities. The base station 14 includes one or more transmit/receive antennas 50, transceiver circuits 52, including the aforementioned transmitter circuits 22, along with receiver circuits 54. Further, the base station's one or more processing circuits 24 here include a scheduler 60 and a DCI transmission controller 62, which may be understood as a version of the transmission controller introduced in FIG. 3.

The mobile station 20 comprises one or more receive/transmit antennas 70, transceiver circuits 72, including a receiver 74 and a transmitter 76. The mobile station 20 further includes one or more processing circuits 78, including a baseband processor 80, which includes or is associated with a DCI decoder 82. The baseband processor 80 in one or more embodiments comprises a microprocessor-based circuit, such as a DSP-based circuit.

As will be understood by those skilled in the art, the DCI decoder 82 of the mobile terminal 20 is configured to blindly decode the DPCCH portion of received OFDM sub-frames, looking for DCI that is particularly targeted to the mobile terminal 20. However, according to the teachings presented in this document, the DCI decoder 82 is further configured to decode DCI from the DPSCH, in at least some operating cases.

Figure 11:
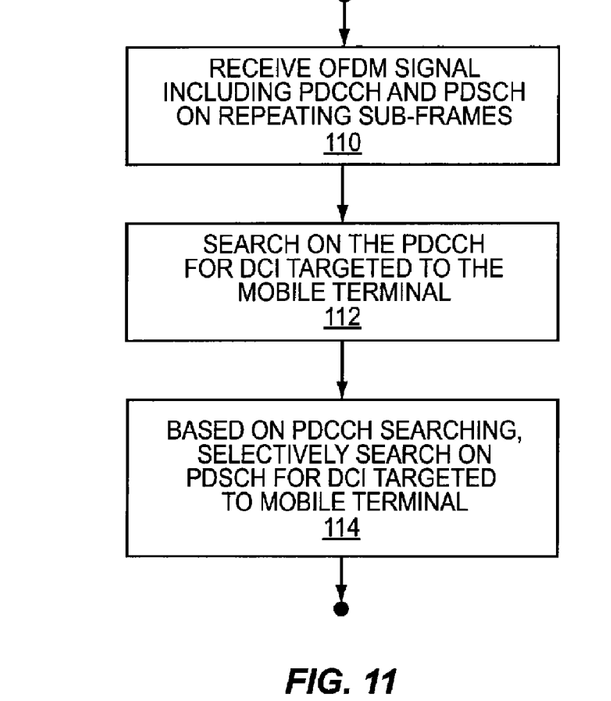
FIGS. 11-13 are logic flow diagrams depicting various embodiments of mobile terminal processing, for receiving/decoding control information from the data portion of a base station's transmit signal.

For example, in one embodiment, the DCI decoder 82 looks for targeted DCI on the PDSCH, on a selective basis, based on the results of its search for targeted DCI on the PDCCH. FIG. 11 depicts such processing, where the mobile terminal 20 receives an OFDM signal, including the PDCCH and PDSCH on repeating sub-frames (Block 110). The mobile terminal 20 searches on the PDCCH for DCI targeted to it (Block 112). Based on that searching, the mobile terminal 20 selectively searches on the PDSCH for DCI targeted to it (Block 114).

Figure 12:
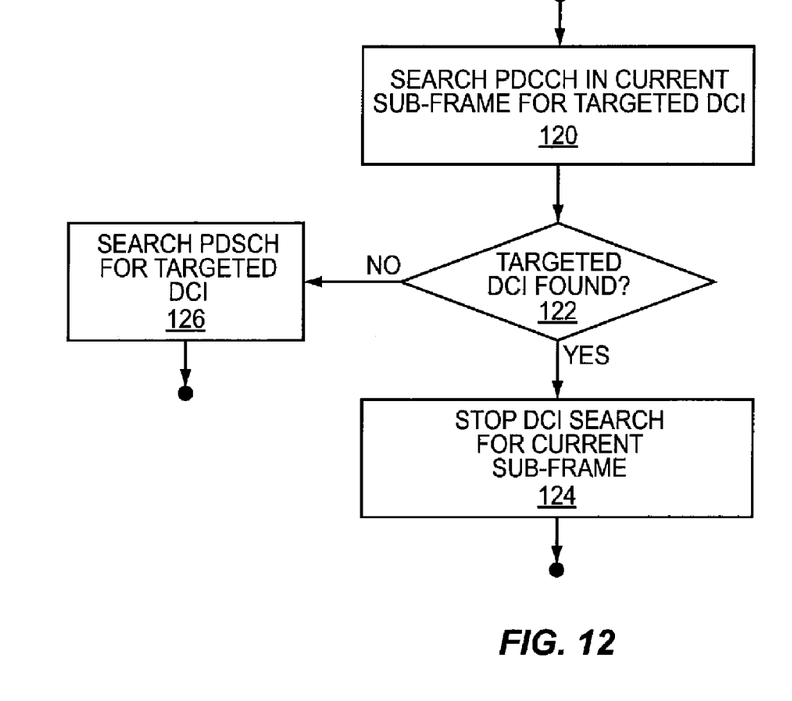

FIG. 12 illustrates one example of this "selective searching." In the illustrated processing, the mobile terminal 20 searches the PDCCH in a current sub-frame of the OFDM signal (Block 120), and it determines whether targeted DCI was found (Block 122). If so (YES from Block 122), the mobile terminal 20 stops its DCI search for the current sub-frame (Block 124)—i.e., if it finds targeted DCI on the PDCCH, it does not search the PDSCH for targeted DCI. On the other hand, if the mobile terminal does not find targeted DCI on the PDCCH in the current sub-frame (NO from Block 122), it extends its DCI searching to the PDSCH, for the current sub-frame (Block 126). Also, it should be noted that a mobile terminal can receive multiple DCI messages per sub-frame. Thus, in one or more embodiments contemplated herein, a mobile terminal that is E-PDCCH is configured to continue looking for DCI in the E-PDCCH, even if it has found a first DCI message in the PDCCH. Such behavior can be configured, for example, via higher layer signaling.

Figure 13:
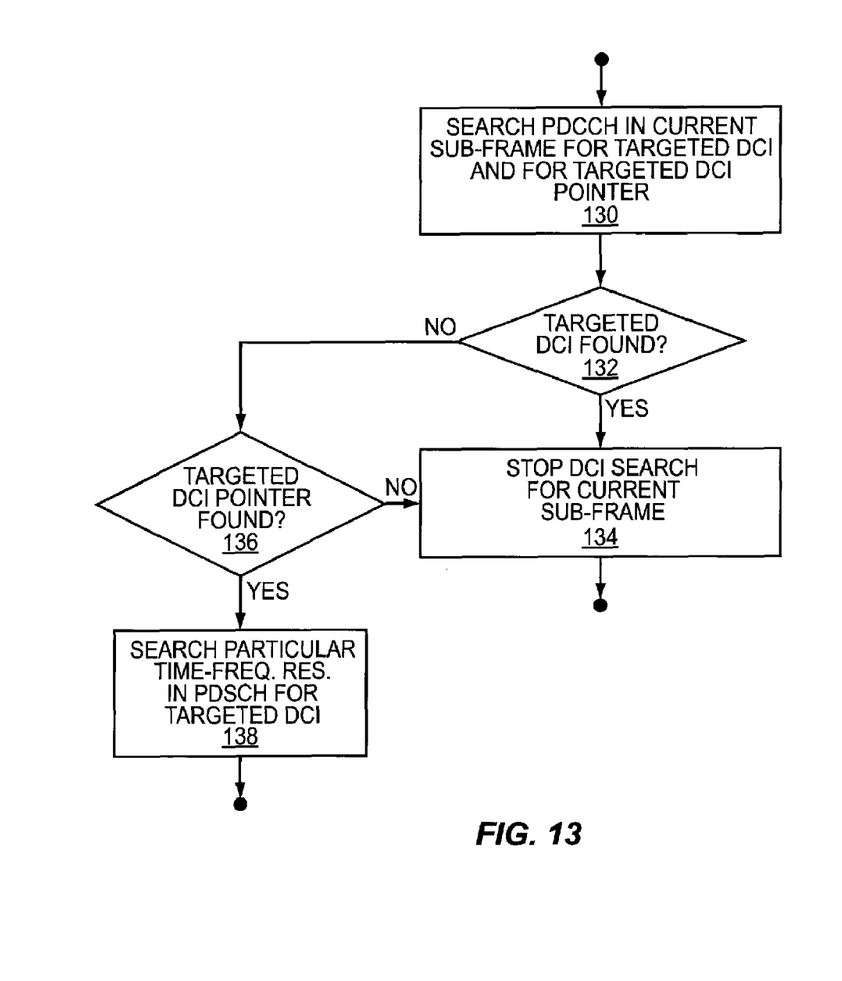

FIG. 13 illustrates another example of mobile terminal processing, wherein the mobile terminal 20 makes a selective determination as to whether it should or should not search for targeted DCI on the PDSCH of any given sub-frame. Here, the mobile terminal 20 searches the PDCCH in the current sub-frame for targeted DCI and for any targeted DCI pointers (Block 130). If the mobile terminal 20 finds targeted DCI on the PDCCH (YES from Block 132), it stops searching for DCI in the current sub-frame (Block 134). On the other hand, if it does not find targeted DCI on the PDCCH, but instead finds a targeted DCI pointer (YES from Block 136), it searches for targeted DCI in the particular time-frequency resources of the PDSCH that are pointed to by the targeted DCI pointer (Block 138).

In a similar embodiment, the DCI pointer is targeted to a given mobile terminal MAC ID, but does not necessarily indicate the PDSCH resources used for carrying targeted DCI. For example, there may be default locations for carrying such information in the PDSCH, or the locations may have been signaled to the mobile terminal 14. In such cases, the receipt of a targeted DCI pointer by a given mobile terminal 14 causes that mobile terminal 14 to search the known or default locations of the PDSCH for targeted DCI. Still further, in at least one embodiment, the base station 14 explicitly signals mobile terminals 20, to indicate whether targeted DCI will be sent to them on the PDSCH.

Figure 14:
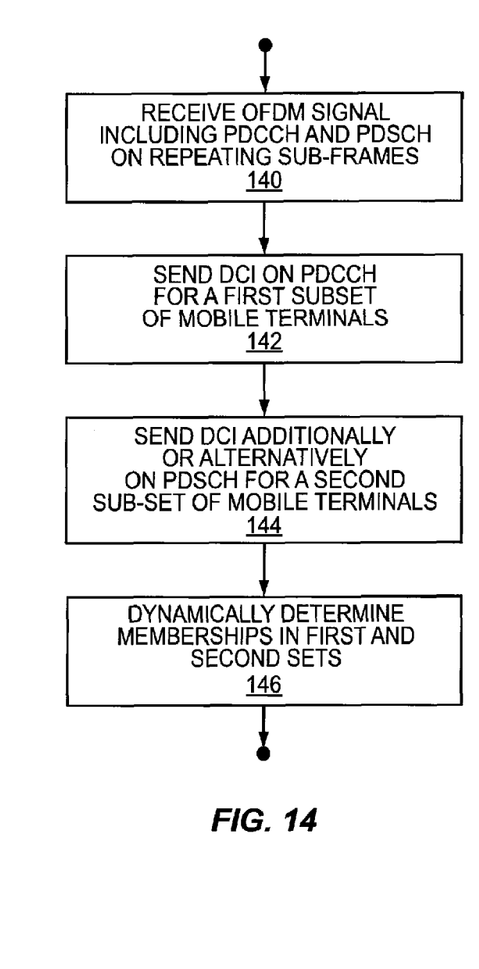
FIG. 14 is a logic flow diagram depicting an embodiment of base station processing logic, for selectively transmitting control information in the data portion of a base station's transmit signal.

In any case, for any given sub-frame (or series of sub-frames) of an OFDM signal being transmitted by the base station 14, the base station 14 may send all DCI on the PDCCH (as would a conventional base station). Alternatively, the base station 14 may choose to send at least a portion of the DCI on the PDSCH—e.g., on the E-PDCCH defined as a logical sub-channel of the PDSCH. FIG. 14 provides a base station processing example. The example represents processing carried out for any given sub-frame, or series of sub-frames of the base station's transmitted OFDM signal.

In the illustrated processing of FIG. 14, the base station 14 transmits an OFDM signal, including the PDCCH and the PDSCH on repeating sub-frames, on an ongoing basis (Block 140). Further, for any one or more sub-frames of the transmitted signal, the base station 14 sends DCI on the PDCCH for a first sub-set of the mobile terminals 20 being supported on the PDCCH/PDSCH by the base station 14 (Block 142). Further, the base station 14 selectively sends DCI (additionally or alternatively) on the PDSCH for a second subset of the mobile terminals (Block 144). Such processing further includes the base station 14 dynamically determining membership in the first and second subsets (Block 146).

Those skilled in the art will appreciate that the actual base station processing may differ from the simplified, sequential processing depicted in FIG. 14. For example, the base station's ongoing determining of sub-set memberships may be done in parallel, or as a background process, while the base station 14 is transmitting control information and data traffic to the mobile terminals 20, on an ongoing basis. Likewise, the selective determination of whether to send all DCI on the PDCCH, or to send at least some of the DCI on the PDSCH, may be based on the base station's ongoing monitoring of whether the PDCCH has sufficient resources for reliably transmitting all of the needed DCI to all of the targeted mobile terminals 20.

As explained earlier, the determination of whether the PDCCH has sufficient resources for transmitting needed DCI depends on a number of variables. For example, the coding gain needed for reliable reception of DCI targeted to a particular mobile terminal 20 will depend on the channel conditions prevailing at that mobile terminal 20. Thus, the overall number of mobile terminals 20 for which DCI can be sent on the PDCCH in any given sub-frame depends on the channel conditions of those terminals 20. Of course, different types of DCI require greater or lesser number of bits, and the overall number of mobile terminals 20 for which DCI can be sent on the PDCCH in any given sub-frame further depends on the particular DCI to be sent.

Broadly, then, in one or more embodiments, the base station 14 is configured to transmit control information and data traffic to mobile terminals 20 in repeating transmission intervals by transmitting an Orthogonal Frequency Division Multiplex (OFDM) signal including repeating sub-frames as said repeating transmission intervals. Each sub-frame comprises a Physical Downlink Control Channel (PDCCH) as the control portion of the sub-frames, and a Physical Downlink Shared Channel (PDSCH) as the data portion of the sub-frames.

In at least one such embodiment, the base station 14 is configured to at least temporarily transmit control information in the data portion, rather than in the control portion, for a selected one or more of the mobile terminals 20 by transmitting control information that is targeted to the selected one or more mobile terminals 20 on the PDSCH, rather than on the PDCCH. In particular, in one such embodiment, the base station 14 is configured to at least temporarily define an E-PDCCH on the PDSCH, and to transmit control information that is targeted to the selected one or more mobile terminals 20 on the PDSCH by transmitting the control information that is targeted to the selected one or more mobile terminals 20 on the E-PDCCH.

The above processing allows the base station 14—e.g., an LTE eNodeB—to increase the robustness of control channel information transmitted to a given mobile terminal 20, based on encoding that information in the data portion of the base station's transmit signal, using a higher coding gain that is achievable in the control portion of the base station's transmit signal. In at least one such embodiment, then, the base station 14 evaluates channel quality reports, e.g., Channel Quality Indicator (CQI) reports from a given mobile terminal 20, as a basis for determining whether the control portion provides sufficient coding gain for reliably transmitting control information to the mobile terminal 20. If not, for at least that mobile terminal 20, and for at least as long as the poor channel conditions persist, the base station 14 sends control information targeted to that mobile terminal 20 using the data portion of the base station's transmissions. Thus, once the control channel robustness provided by the coding and/or boosting of the PDCCH becomes insufficient, the base station 14 uses a higher coding gain for that control information, and sends it on the E-PDCCH.

In general, the mobile terminal 20 treats DCI received on the E-PDCCH as it would DCI conventionally received on the PDCCH. However, in at least one embodiment, control information pertaining to downlink resource assignments is valid for a future sub-frame, rather than for the current sub-frame. For example, conventionally, targeted DCI that tells a given mobile terminal 20 which PDSCH resources carry downlink data traffic for it is used for PDSCH decoding in the same sub-frame in which the DCI is received. That is, downlink resource allocation information is sent in the same sub-frame in which the downlink data traffic is sent. As contemplated herein, however, downlink resource assignment information that is sent to a given mobile terminal 20 on the E-PDCCH in a given sub-frame pertains to a future sub-frame, rather than the current sub-frame.

In one such embodiment, the control information sent on the E-PDCCH pertains to a next sub-frame, rather than the current sub-frame. This arrangement relieves buffering and processing overhead—i.e., the processing delay budget—at the mobile terminal 20, as compared to having PDSCH-carried control information apply to the current sub-frame. However, for LTE, it introduces a delay of one sub-frame (1 ms), but a mobile terminal 20 receiving DCI on the E-PDCCH can still receive DCI every sub-frame. Such information is just "offset" by one sub-frame. As noted, in the general case, the control information sent on the E-PDCCH pertains to a future sub-frame, which may be the next sub-frame or some later sub-frame, and the delay (offset) described here is therefore at least one sub-frame.

Thus, one or several Radio Bearers (RBs) in the PDSCH are used to carry the control information of a future sub-frame, such as the next sub-frame. This effectively extends the PDCCH region in the time direction, such that the PDCCH can extend into the PDSCH portion of the sub-frame, at least for selected OFDM sub-carriers. As noted, the PDSCH resources given over to the transmission of control information can be known by the mobile terminal 20 on an a priori basis, such that, upon failing to successfully decode control information from the standard PDCCH region, it continues decoding the control regions of the PDSCH. Although any control information decoded from the PDSCH may relate to the next sub-frame, thereby imposing an initial latency of one sub-frame, the scheduling information for the next sub-frame and decoding of the data indicated by the control information of the previous sub-frame can be carried out simultaneously.

Additionally, a given mobile terminal 20 may operate according to rules that determine when it will look for control information in the PDSCH region. For example, the extended searching mode can be invoked whenever the mobile terminal 20 is known to be in a low-SNR scenario, and its decoding of the conventional PDCCH was not successful. Referring back to FIG. 12, for a moment, one sees that Block 126 can be modified in this regard.

For example, the mobile terminal 20 may apply two tests: first, the mobile terminal 20 determines whether targeted DCI was found in the PDCCH region (Block 122). If not, then the mobile terminal 20 may evaluate its channel conditions, e.g., its current or last measure of received signal quality. If signal quality is high, e.g., above a defined threshold, the mobile terminal 20 has no reason to believe that it missed finding targeted DCI in the PDCCH, and it thus does not extend its search for control information into the PDSCH. On the other hand, if the mobile terminal 20 failed to find targeted DCI in the PDCCH and its signal quality is low, then the mobile terminal 20 extends its search for control information into the PDSCH.

Of course, the present invention is not limited to the foregoing description, or by the accompanying drawings. Rather, the present invention is limited only by the following appended claims, and their legal equivalents.

What is claimed is:

1. A method in a wireless communication network base station of transmitting downlink control information to a plurality of mobile terminals, said method comprising:
   transmitting control information and data traffic to the mobile terminals in repeating transmission intervals, each transmission interval having a control portion that is defined for transmitting control information to targeted ones of the mobile terminals and a data portion that is defined for transmitting data traffic to targeted ones of the mobile terminals;
   dynamically determining that the control portion has insufficient resources for transmitting control information to one or more of the mobile terminals by determining that an overall information-carrying capacity of the control portion is insufficient, in consideration of collective amounts of control information to be sent in the control portion and corresponding coding gains needed for reliable reception of that control information; and
   responsive to said determining, at least temporarily transmitting control information in the data portion, rather than in the control portion, for a selected one or more of the mobile terminals.

2. The method of claim 1, further comprising, responsive to said determination, selecting the selected one or more of the mobile terminals according to a function that minimizes transmission resources in the data portion that are given over to the transmission of control information.

3. A method in a wireless communication network base station of transmitting downlink control information to a plurality of mobile terminals, said method comprising:
   transmitting control information and data traffic to the mobile terminals in repeating transmission intervals, each transmission interval having a control portion that is defined for transmitting control information to targeted ones of the mobile terminals and a data portion that is defined for transmitting data traffic to targeted ones of the mobile terminals;
   dynamically determining that the control portion has insufficient resources for transmitting control information to one or more of the mobile terminals by determining that radio reception conditions at a particular one or more of the mobile terminals are such that a maximum coding gain achievable for control information transmitted in the control portion is insufficient for reliable reception of control information at the particular one or more of the mobile terminals; and
   responsive to said determining, at least temporarily transmitting control information in the data portion, rather than in the control portion, for a selected one or more of the mobile terminals.

4. The method of claim 1, wherein transmitting control information and data traffic to mobile terminals in repeating transmission intervals comprises transmitting an Orthogonal Frequency Division Multiplex (OFDM) signal including repeating sub-frames as said repeating transmission intervals, each sub-frame comprising a Physical Downlink Control Channel (PDCCH) as said control portion of the sub-frames, and a Physical Downlink Shared Channel (PDSCH) as said data portion of the sub-frames.

5. The method of claim 4, wherein at least temporarily transmitting control information in the data portion, rather than in the control portion, for a selected one or more of the mobile terminals comprises transmitting control information that is targeted to the selected one or more mobile terminals on the PDSCH, rather than on the PDCCH.

6. The method of claim 5, further comprising at least temporarily defining an Extended PDCCH (E-PDCCH) on the PDSCH, and wherein transmitting control information that is targeted to the selected one or more mobile terminals on the PDSCH comprises transmitting the control information that is targeted to the selected one or more mobile terminals on the E-PDCCH.

7. The method of claim 3, wherein at least temporarily transmitting control information in the data portion, rather than in the control portion, comprises transmitting control information targeted to the particular one or more of the mobile terminals in the data portion using a coding gain that is higher than the maximum coding gain achievable in the control portion.

8. The method of claim 3, wherein at least temporarily transmitting control information in the data portion comprises, at least for so long as the maximum coding gain of the control portion is deemed insufficient, transmitting control information that is targeted to the given mobile terminal in the data portion, rather than in the control portion.

9. The method of claim 8, further comprising reverting back to transmitting control information that is targeted to the given mobile terminal in the control portion, responsive to determining that the maximum coding gain achievable in the control portion is sufficient for reliable reception of control information by the given mobile terminal.

10. A method in a wireless communication network base station of transmitting downlink control information and data traffic to a plurality of mobile terminals in repeating transmission intervals, each said transmission interval predefined to include a control portion designated for transmitting control information and a data portion designated for transmitting data traffic, said method comprising:
   using said control portion in said repeating transmission intervals to transmit control information for mobile terminals in a first subset of said plurality of mobile terminals, while using said data portion in said repeating transmission intervals to transmit data traffic to the mobile terminals in said first subset;

using said data portion in said repeating transmission intervals to transmit both control information and data traffic for mobile terminals in a second subset of said plurality of mobile terminals;

dynamically determining subset membership for individual ones in said plurality of mobile terminals.

11. The method of claim 10, wherein said base station transmits an Orthogonal Frequency Division Multiplex (OFDM) signal that includes repeating sub-frames as said repeating transmission intervals, each sub-frame comprising a Physical Downlink Control Channel (PDCCH) as said control portion of the sub-frames, and a Physical Downlink Shared Channel (PDSCH) as said data portion of the sub-frames.

12. The method of claim 11, further comprising at least temporarily defining an Extended PDCCH (E-PDCCH) on the PDSCH, and wherein using the data portion of said repeating transmission intervals for transmitting control information for the mobile terminals in said second subset comprises transmitting that control information on the E-PDCCH.

13. A base station for use in a wireless communication network, said base station comprising:

transmitter circuits configured to transmit control information and data traffic to mobile terminals in repeating transmission intervals, each transmission interval having a control portion that is defined for transmitting control information to targeted ones of the mobile terminals and a data portion that is defined for transmitting data traffic to targeted ones of the mobile terminals;

one or more processing circuits that are operatively associated with the transmitter circuits and are configured to:

dynamically determine that the control portion has insufficient resources for transmitting control information to one or more of the mobile terminals by determining that an overall information-carrying capacity of the control portion is insufficient, in consideration of collective amounts of control information to be sent in the control portion and corresponding coding gains needed for reliable reception of that control information; and responsive to said determination, at least temporarily transmit control information in the data portion, rather than in the control portion, for a selected one or more of the mobile terminals.

14. The base station of claim 13, wherein the base station is configured to, responsive to said determination, select the selected one or more of the mobile terminals according to a function that minimizes transmission resources in the data portion that are given over to the transmission of control information.

15. The base station of claim 13, wherein the base station is configured to transmit control information and data traffic to mobile terminals in repeating transmission intervals by transmitting an Orthogonal Frequency Division Multiplex (OFDM) signal including repeating sub-frames as said repeating transmission intervals, each sub-frame comprising a Physical Downlink Control Channel (PDCCH) as said control portion of the sub-frames, and a Physical Downlink Shared Channel (PDSCH) as said data portion of the sub-frames.

16. The base station of claim 15, wherein the base station is configured to at least temporarily transmit control information in the data portion, rather than in the control portion, for a selected one or more of the mobile terminals by transmitting control information that is targeted to the selected one or more mobile terminals on the PDSCH, rather than on the PDCCH.

17. The base station of claim 16, wherein the base station is configured to at least temporarily define an Extended PDCCH (E-PDCCH) on the PDSCH, and to transmit control information that is targeted to the selected one or more mobile terminals on the PDSCH by transmitting the control information that is targeted to the selected one or more mobile terminals on the E-PDCCH.

18. A base station for use in a wireless communication network, said base station comprising:

transmitter circuits configured to transmit control information and data traffic to mobile terminals in repeating transmission intervals, each transmission interval having a control portion that is defined for transmitting control information to targeted ones of the mobile terminals and a data portion that is defined for transmitting data traffic to targeted ones of the mobile terminals;

one or more processing circuits that are operatively associated with the transmitter circuits and are configured to:

dynamically determine that the control portion has insufficient resources for transmitting control information to one or more of the mobile terminals by determining that radio reception conditions at a particular one or more of the mobile terminals are such that a maximum coding gain achievable for control information transmitted in the control portion is insufficient for reliable reception of control information at the particular one or more of the mobile terminals; and responsive to said determination, at least temporarily transmit control information in the data portion, rather than in the control portion, for a selected one or more of the mobile terminals.

19. The base station of claim 18, wherein the base station is configured to at least temporarily transmit control information in the data portion, rather than in the control portion, by transmitting control information targeted to the particular one or more of the mobile terminals in the data portion using a coding gain that is higher than the maximum coding gain achievable in the control portion.

20. The base station of claim 18, wherein the base station is configured to at least temporarily transmit control information in the data portion by, at least for so long as the maximum coding gain of the control portion is deemed insufficient, transmitting control information that is targeted to the given mobile terminal in the data portion, rather than in the control portion.

21. The base station of claim 20, wherein the base station is configured to revert back to transmitting control information that is targeted to the given mobile terminal in the control portion, responsive to determining that the maximum coding gain achievable in the control portion is sufficient for reliable reception of control information by the given mobile terminal.

* * * * *

UNITED STATES PATENT AND TRADEMARK OFFICE
CERTIFICATE OF CORRECTION

PATENT NO.      : 8,005,039 B2                                              Page 1 of 1
APPLICATION NO. : 12/464615
DATED           : August 23, 2011
INVENTOR(S)     : Kamuf et al.

It is certified that error appears in the above-identified patent and that said Letters Patent is hereby corrected as shown below:

On the Face Page, in Field (54), in Title, in Column 1, Line 3, delete "IN" and insert -- IN A --, therefor.

On the Face Page, in Field (74), under "Attorney, Agent, or Firm", in Column 2, Line 1, delete "Coates" and insert -- Coats --, therefor.

In Column 1, Line 3, delete "IN" and insert -- IN A --, therefor.

Signed and Sealed this
Tenth Day of January, 2012

David J. Kappos
*Director of the United States Patent and Trademark Office*